United States Patent
Garcia

(10) Patent No.: US 9,852,316 B2
(45) Date of Patent: Dec. 26, 2017

(54) SYSTEM AND METHOD FOR BULK RFID TAG ENCODING

(71) Applicant: Avery Dennison Corporation, Pasadena, CA (US)

(72) Inventor: Philippe Garcia, Brea, CA (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 43 days.

(21) Appl. No.: 13/690,375

(22) Filed: Nov. 30, 2012

(65) Prior Publication Data

US 2013/0141222 A1 Jun. 6, 2013

Related U.S. Application Data

(60) Provisional application No. 61/565,566, filed on Dec. 1, 2011.

(51) Int. Cl.
*H04Q 5/22* (2006.01)
*G06K 7/01* (2006.01)
(Continued)

(52) U.S. Cl.
CPC ........... *G06K 7/01* (2013.01); *G06K 7/10039* (2013.01); *G06K 7/10326* (2013.01);
(Continued)

(58) Field of Classification Search
CPC .. G06K 19/0723; G06K 7/01; G06K 7/10039; G06K 7/10326; G06K 7/10435;
(Continued)

(56) References Cited

U.S. PATENT DOCUMENTS 4,751,805 A * 6/1988 Walter ................... B29C 51/18
53/168
5,942,987 A 8/1999 Heinrich et al.
(Continued)

FOREIGN PATENT DOCUMENTS

| EP | 1587018 | 10/2005 |
|---|---|---|
| WO | 2006/033743 | 3/2006 |
| WO | 2006/131544 | 12/2006 |

OTHER PUBLICATIONS

International Search Report dated Feb. 20, 2013 for International Application No. PCT/US2012/067240.
(Continued)

*Primary Examiner* — Zhen Y Wu
(74) *Attorney, Agent, or Firm* — Avery Dennison Retail Information Services, LLC

(57) ABSTRACT

A method for bulk encoding of RFID tags. The method may include printing a plurality of unencoded RFID labels, coupling each of the plurality of unencoded RFID labels to each of a plurality of products, packaging like products from the plurality of products coupled with the unencoded RFID labels together in a container, scanning the container holding the products with an RFID antenna, and encoding each of the unencoded RFID labels coupled to each of the plurality of like products in a container simultaneously with identical information for each container.

16 Claims, 3 Drawing Sheets

(51) Int. Cl.
   *G06K 7/10* (2006.01)
   *G06K 17/00* (2006.01)

(52) U.S. Cl.
   CPC ..... *G06K 7/10435* (2013.01); *G06K 7/10445* (2013.01); *G06K 17/0025* (2013.01); *G06K 17/0029* (2013.01)

(58) Field of Classification Search
   CPC ........... G06K 7/10445; G06K 17/0025; G06K 17/0029
   USPC ........................................................ 340/10.51
   See application file for complete search history.

(56) References Cited

U.S. PATENT DOCUMENTS

| | | | | |
|---|---|---|---|---|
| 6,967,579 | B1* | 11/2005 | Elizondo | B64F 1/368 340/572.1 |
| 7,752,086 | B2* | 7/2010 | De Lamaziere | G06Q 10/087 209/552 |
| 2002/0118097 | A1 | 8/2002 | Heinrich et al. | |
| 2002/0158751 | A1* | 10/2002 | Bormaster | G06K 7/0008 340/10.2 |
| 2005/0004704 | A1* | 1/2005 | Wiesenbach De Lamaziere | G06Q 10/087 700/219 |
| 2006/0221363 | A1 | 10/2006 | Roth et al. | |
| 2006/0255140 | A1* | 11/2006 | Jusas et al. | 235/451 |
| 2007/0126578 | A1* | 6/2007 | Broussard | G06K 17/0022 340/572.1 |
| 2007/0208456 | A1* | 9/2007 | Uland | G06Q 10/08 700/225 |
| 2007/0279191 | A1* | 12/2007 | Yamamoto | G06K 7/0008 340/10.1 |
| 2008/0040246 | A1* | 2/2008 | Fukamachi | B65G 1/1371 705/29 |
| 2009/0072952 | A1* | 3/2009 | Niiyama | G06K 7/10079 340/10.51 |
| 2009/0306816 | A1* | 12/2009 | Champel | B07C 5/34 700/223 |
| 2011/0087612 | A1* | 4/2011 | Yuasa | G06Q 10/08 705/332 |
| 2011/0303751 | A1* | 12/2011 | Lai | G06K 19/027 235/492 |
| 2012/0299703 | A1* | 11/2012 | Chen | G06Q 10/087 340/10.1 |
| 2013/0048711 | A1* | 2/2013 | Burns | G06K 5/02 235/375 |
| 2013/0141222 | A1* | 6/2013 | Garcia | G06K 7/01 340/10.51 |

OTHER PUBLICATIONS

Written Opinion dated Feb. 20, 2013 for International Application No. PCT/US2012/067240.
International Preliminary Report on Patentability dated Jun. 3, 2014 for International Application No. PCT/US2012/067240.

* cited by examiner

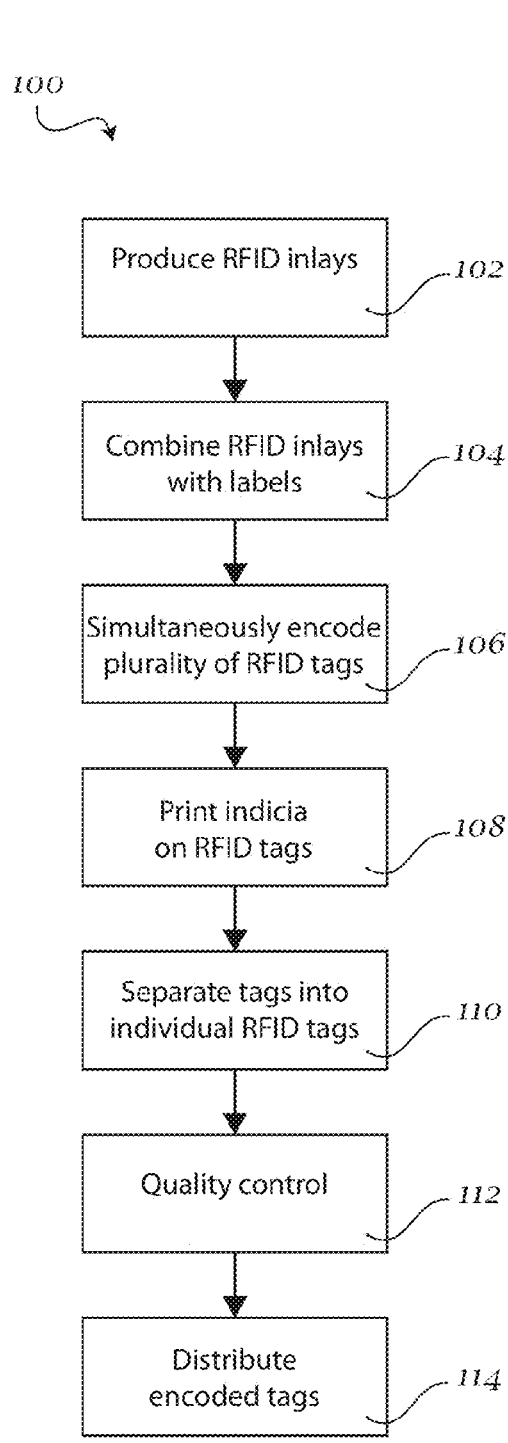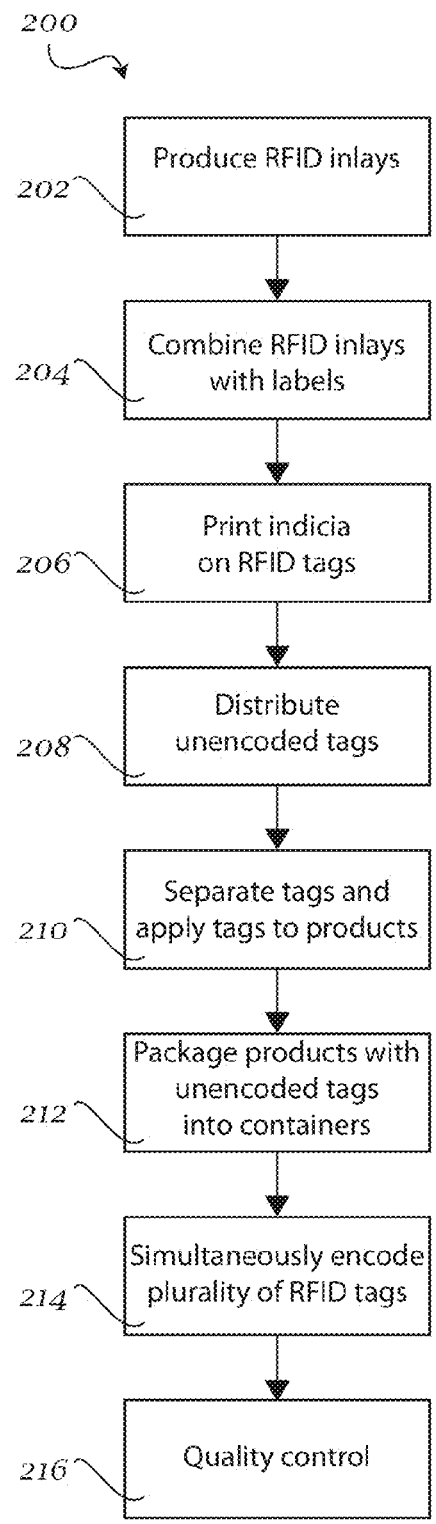
Fig. 1a                    Fig. 1b

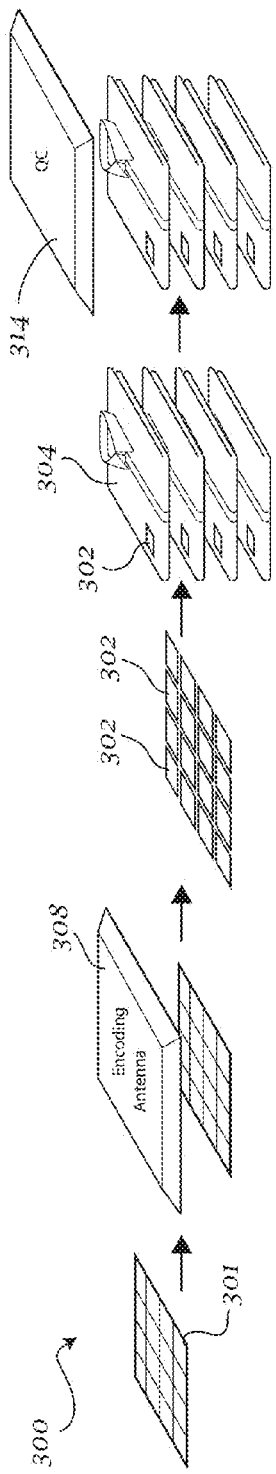
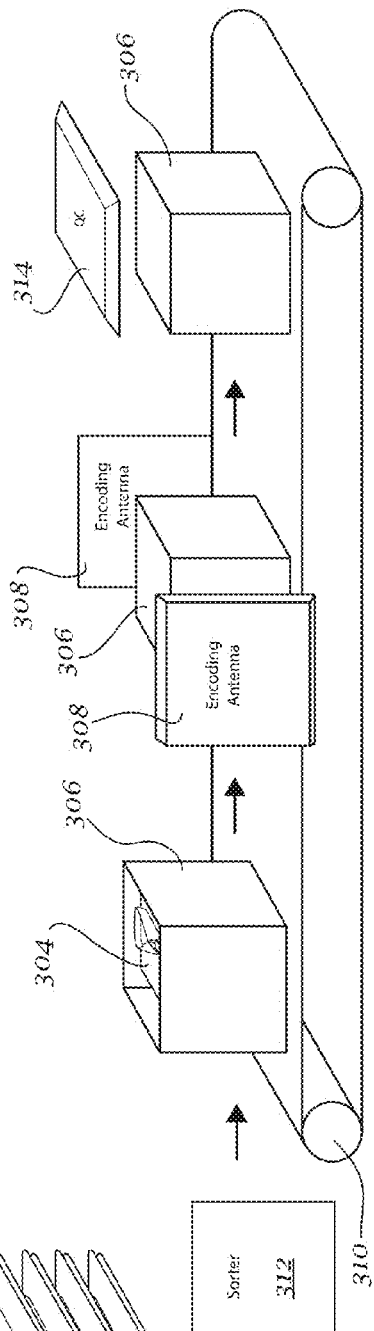
Fig. 3a
Fig. 3b

SYSTEM AND METHOD FOR BULK RFID TAG ENCODING

CROSS-REFERENCE TO RELATED APPLICATION

The present application claims the benefit of U.S. Provisional Patent Application No. 61/565,566 filed Dec. 1, 2011, which is incorporated herein by reference in its entirety.

FIELD OF THE INVENTION

The present invention is found in the field inventory tracking and tracing and more particularly, the present invention uses radio frequency identification (RFID) tags and labels which are encoded en masse in order to track various items.

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners.

Prior to being put into use for a desired purpose, RFID tags require encoding with data pertinent for the desired purpose. Typically, such encoding is performed by the RFID tag manufacturer, and delivered down line, for example to a product supplier, distributor or reseller, where the already-encoded RFID tags are applied to corresponding products. For example, a "swing ticket" for a product may include an RFID inlay, which is encoded at the time of printing the swing ticket. The encoded swing tickets are then applied to the corresponding products. Alternatively, RFID tags may be encoded initially, combined with the tags to create an inlay, with the inlay then being applied to the corresponding products. However, present methods of encoding RFID tags can create bottlenecks and slow down the product manufacturing and distribution chains, as each encoded RFID tag must be coordinated with the particular product to which the tag corresponds.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to at least one exemplary embodiment, a method for bulk encoding of RFID tags is disclosed. The method may include printing a plurality of unencoded RFID labels, coupling each of the plurality of unencoded RFID labels to each of a plurality of products, packaging like products from the plurality of products coupled with the unencoded RFID labels together in a container, scanning the container holding the products with an RFID antenna, and encoding each of the unencoded RFID labels coupled to each of the plurality of like products in a container simultaneously with identical information for each container.

According to another exemplary embodiment, a system for encoding RFID tags in a container with uniform information is disclosed. The system may include a plurality of unencoded RFID tags, a plurality of products, a plurality of containers, and at least one RFID antenna, wherein each of the plurality of unencoded RFID tags are coupled to each of the plurality of products and each of the plurality of products are placed with similar products in each of the plurality of containers, and each of the plurality of RFID tags in each container is simultaneously encoded by the at least one RFID antenna with identical data.

In a yet still further exemplary embodiment of the presently described invention, a method of bulk encoding RFID tags, is described and includes initially printing a plurality of unencoded RFID tags and then coupling each of the plurality of unencoded RFID tags to each of a plurality of products. Next, like products are advanced from the plurality products coupled with the unencoded RFID tags along a length of a conveyor and then scanning each of the products with at least one RFID antenna. Finally, each of the unencoded RFID tags coupled to each of the plurality of like products is encoded with identical information sequentially one after another while on the length of the conveyor.

In a still further exemplary embodiment of the presently described invention, a system for encoding RFID tags with uniform information, includes a plurality of unencoded RFID tags, a plurality of products; and at least one RFID antenna. Each of the plurality of unencoded RFID tags are coupled to each of the plurality of products. Each of the plurality of unencoded RFID tags is substantially simultaneously encoded one after another with identical data by the at least one RFID antenna.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 1a shows an exemplary embodiment of a method for bulk encoding of RFID labels;

FIG. 1b shows an exemplary embodiment of a method for bulk encoding of RFID labels;

FIG. 3a shows an exemplary embodiment of a system for encoding with uniform information a plurality of RFID tags; and FIG. 3b shows another exemplary embodiment of a system for encoding with uniform information a plurality of RFID tags.

DETAILED DESCRIPTION OF THE INVENTION

Figure 2A:
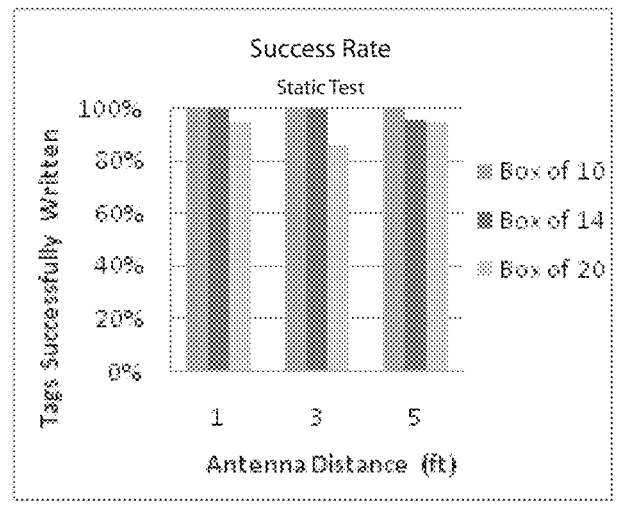
FIG. 2a shows encoding success rates of exemplary generic RFID tags when utilizing static encoding methods.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

FIG. 1a shows an exemplary embodiment of a method 100 for bulk encoding of RFID labels. The steps of method 100 may be carried out on site at an RFID tag manufacturing location or any other desired location. In step 102, a plurality of RFID inlays may be manufactured. At step 104, the plurality of inlays may be combined with a plurality of labels, for example, a roll of labels combined with inlays, a sheet of labels combined with inlays, or any other desired arrangement of labels in combination with inlays, so as to form RFID tags.

At step 106, each group of RFID tags (for example, a sheet of RFID tags, a roll of RFID tags, a plurality of hard tags, or any other desired arrangement) may be scanned by at least one RFID encoding antenna so as to simultaneously encode, with identical data, the group of RFID tags. Encoding may be accomplished by one encoding antenna, a pair of encoding antennas arranged opposite each other, or by any other desired number or arrangement of antennas. Further, the RFID tags may be encoded with any desired data.

At step 108, indicia may be printed on each of the RFID tags, if necessary. Such indicia may include price indicia, Universal Product Code (UPC) indicia, Electronic Product Code (EPC) indicia, indicia pertaining to the qualities or characteristics of the merchandise to which the label is to be applied, such as, for example, size, style, trim number, price, and so forth, or any other indicia that may be desired. Alternatively, the RFID inlays may be separate from the labels, for example RFID-only tags such as hard tags and pressure-sensitive tags.

At step 110, if the RFID tags are part of an group such as a sheet, a roll, or any other arrangement wherein the RFID tags are coupled to each other, the RFID tags may be separated from each other, for example by die cutting or by any other separation method. At step 112, the RFID tags may be bulk scanned by a quality control unit, for example an interrogator antenna, so as to test the encoded tags for a proper, uniform response. Nonconforming RFID tags may be discarded, reserved for re-encoding, or otherwise removed from the process. Subsequently, at step 114, the RFID tags may be distributed to a location remote from the RFID manufacturing/label printing location, for example to a product manufacturer, a distributor, a reseller, or a retail location, where they may be applied to desired products.

FIG. 1b shows another exemplary embodiment of a method 200 for bulk encoding of RFID labels. Steps 202-206 of method 200 may be carried out at an RFID tag manufacturing location or any other desired location. In step 202, a plurality of RFID inlays may be manufactured. At step 204, the plurality of inlays may be combined with a plurality of labels, for example, a roll of labels combined with inlays, a sheet of labels combined with inlays, or any other desired arrangement of labels in combination with inlays, so as to form RFID tags. At step 206, indicia may be printed on each of the RFID tags. Such indicia may include price indicia, Universal Product Code (UPC) indicia, Electronic Product Code (EPC) indicia, indicia pertaining to the qualities or characteristics of the merchandise to which the label is to be applied, such as, for example, size, style, trim number, price, and so forth, or any other indicia that may be desired. Alternatively, the RFID inlays may be separate from the labels, for example RFID-only tags such as hard tags and pressure-sensitive tags. The RFID tags are not encoded during the combination or printing processes.

Subsequently, at step 208, the RFID tags may be distributed to a location remote from the RFID manufacturing/label printing location, for example to a product manufacturer, a distributor, a reseller, or a retail location, where the remainder of the steps of process 200 may be carried out. At step 210, the plurality of RFID tags may be applied to a plurality of products, such that one RFID tag of the plurality of RFID tags is applied to an individual product amongst the plurality of products. The RFID tags and the products may be identified and sorted such that RFID tags having particular printed indicia are coupled to particular corresponding products. For example, the products may be sorted and grouped by corresponding stock-keeping unit (SKU) numbers, UPC numbers, EPC numbers, or other identification indicia. The corresponding RFID tags may then be coupled to the products by matching the indicia on the RFID tags with the indicia on the products.

In some exemplary embodiments, the products involved may be apparel and garment products. In such cases, the RFID tags may be applied to the products by a variety of methods, for example, by sewing, adhesive, clips, by known methods of attaching hard tags to products, or by any other attachment method known in the art.

At step 212, the products and RFID tags coupled thereto may be packaged into containers. Each container may contain only one type of product; for example, each container may contain products having the same SKU or other product-identifying indicia. In some embodiments, the products and RFID tags coupled thereto may also be sorted prior to packaging into containers so as to ensure that all desired products are coupled with RFID tags and that each container contains only like products therein.

It should be understood, that while embodiments herein describe placing the plurality of objects in containers or packaging the products together, it should be understood that the products may travel relatively adjacent one another along a length of a conveyor belt or other device used for moving goods and the individual products may be considered as one package or container or one item or product.

At step 214, each container having products and RFID tags coupled thereto may be scanned by at least one RFID encoding antenna so as to simultaneously encode, with identical data, the RFID tags within the container. Information about the products within each container may be correlated to the at least one RFID encoding antenna so that the appropriate containers may be encoded at the appropriate times. Encoding may be accomplished by one encoding antenna, by a pair of encoding antennas arranged opposite each other such that the container can be disposed between the antennas, or by any other desired number or arrangement of antennas. Encoding may be accomplished via a variety of antenna and RFID tag configurations to achieve desired results. For example, encoding may be performed while a container is statically disposed proximate to the antenna, or encoding may be performed while a container or series of containers are dynamically moving past the antenna, such as on a conveyor belt. The speed of movement of the containers may be varied as desired, and may range from 0 feet per minute to approximately 600 feet per minute. In one embodiment, the speed of movement of the containers may be approximately 100 feet per minute. Information regarding products in the containers may be communicated to the encoding antenna such that the information encoded by the RFID encoding antenna corresponds to the particular products that are disposed within a particular container.

In some exemplary embodiments utilizing static encoding, the distance between the at least one antenna and the container may be adjusted as desired. For example, the at least one antenna may be located between approximately 1 foot and approximately 5 feet from the container. In the case of dynamic encoding, the at least one antenna may be located approximately 15 inches from the container. Furthermore, the orientation of the RFID tags within the container with respect to the at least one antenna may be varied as desired. For example, the RFID tags may be oriented at 0° with respect to the at least one antenna, or the RFID tags may be oriented at 90° with respect to the at least one antenna, or any desired variation thereof.

In another exemplary embodiment, the products disposed within the container may be apparel and garment products that have a generally planar shape when folded and stacked in the container. The amount of products disposed within the container may also be varied as desired. For example, a container may contain between 10 and 20 stacked garment products.

Figure 2B:
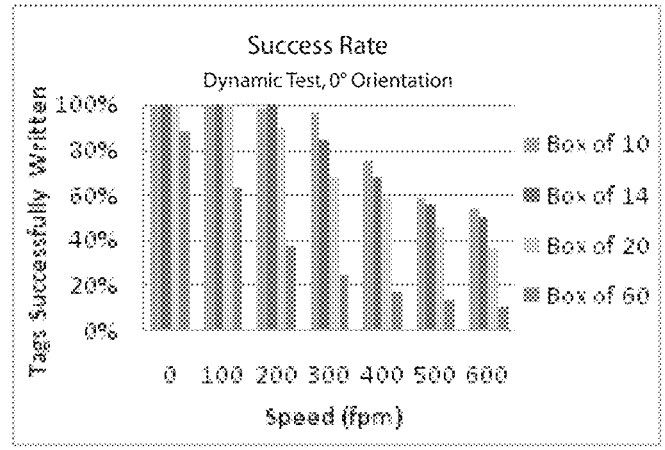
FIG. 2b shows encoding success rates of exemplary generic RFID tags when utilizing dynamic encoding methods.

It should be appreciated that diverse types of RFID tags may be used as desired for the bulk encoding method disclosed herein. The sensitivity of an RFID tag to the various parameters of the bulk encoding method (such as static or dynamic encoding, speed of dynamic encoding, tag orientation, amount of products in a container, and distance between the encoding antenna and the container) may vary depending on the type of RFID tag that is used. Therefore, the above-described parameters of the bulk-encoding method may be correlated to the particular tag that is desired to be used. Non-limiting examples of RFID tags that may be used with the bulk encoding method disclosed herein include the AD-230, AD-284 and AD-826 tags manufactured by Avery Dennison Corporation. FIGS. 2a-2b show exemplary encoding success rates of generic RFID tags when utilizing static and dynamic encoding methods.

Subsequently, at step 216, the products having encoded RFID tags applied thereto may be bulk scanned by a quality control unit, for example an interrogator antenna, so as to test the encoded tags for a proper, uniform response. Nonconforming product/RFID tag combinations may be reserved for re-encoding or reworking, or otherwise removed from the process.

Exemplary FIGS. 3a-3b show another embodiment of a system 300 for encoding with uniform information a plurality of RFID tags. System 300 may include a plurality of unencoded RFID tags 302, a plurality of products 304, a plurality of containers 306 and at least one RFID antenna 308 for simultaneously encoding the unencoded RFID tags. System 300 may further include a conveyor 310 for transporting the plurality of containers 306 proximate to the at least one RFID antenna 308, a sorting mechanism 312 for products and containers to facilitate placing desired products 304 in the corresponding containers 306, and a quality control unit 314 to test the encoded tags for a proper, uniform response. System 300 may further include a plurality of additional antennas 308 disposed at desired locations in relation to conveyor 310 and to other antennas 308.

In one embodiment of system 300, as shown in FIG. 3a, groups of RFID tags 302 such as a sheet of RFID tags 301, a roll of RFID tags 303, a plurality of hard tags, or any other desired arrangement, may be scanned by the at least one RFID encoding antenna 308 so as to simultaneously encode, with identical data, the group of RFID tags 302. Encoding may be accomplished by one encoding antenna 308, by a pair of encoding antennas arranged opposite each other, or by any other desired number or arrangement of antennas. RFID tags 302 may then be separated from each other, for example by die cutting or by any other separation method. Subsequently, the encoded RFID tags may be coupled to desired products. Products 304 having encoded RFID tags 302 applied thereto may then be bulk scanned by quality control unit 314, for example an interrogator antenna, so as to test the encoded tags for a proper, uniform response. Nonconforming or duplicate product/RFID tag combinations may be reserved for re-encoding or reworking, or otherwise removed from the process.

In another embodiment of system 300, as show in FIG. 3b, a group of RFID tags 302, such as a sheet of RFID tags 301, a roll of RFID tags 303, a plurality of hard tags, or any other desired arrangement, may be separated so as to form a plurality of individual RFID tags 302. Subsequently, each of the plurality of unencoded RFID tags 302 may be coupled with each of the plurality of products 304. In one embodiment, products 304 may be apparel and garment products. RFID tags 302 may be RFID inlays combined with labels having indicia printed thereon, the tag then being coupled to a product 304. Alternatively, RFID tags 302 may be RFID tags that are sewn into the products 304. RFID tags 302 may also be reusable, and re-circulated tags, for example such as hard tags that are coupled to products 304 using known methods of coupling hard tags.

Products 304 with unencoded RFID tags 302 coupled thereto may then be placed in a container 306. In some embodiments, the products 304 with unencoded RFID tags 302 coupled thereto may also be sorted by sorting mechanism 312 prior to packaging into containers 306 so as to ensure that all desired products are coupled with RFID tags and that each container 306 contains the same or similar type of product, for example, products having the same SKU or other identifying indicia. The containers 306 may then be conveyed towards at least one RFID antenna 308 via conveyor 310, or may be placed proximate to RFID antenna 308 in the absence of a conveyor. The speed of the conveyor may be adjusted as desired, for example between 0 and 600 feet per minute. Additionally, the distance between the at least one RFID antenna 308 and the containers 306 may be adjusted as desired, for example between approximately 1 foot and approximately 5 feet between the at least one RFID antenna and the container. Such adjustments may be made based on the type of RFID tag 302 that is being used, the amount of products 304 per container, or based on any other pertinent or desired considerations. Subsequently, products 304 having encoded RFID tags applied thereto may be bulk scanned by quality control unit 314, which may, for example, have an interrogator antenna, so as to test the encoded tags for a proper, uniform response. Nonconforming or duplicate product and/or RFID tag combinations may be reserved for re-encoding or reworking, or otherwise removed from the process.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of bulk encoding radio frequency identification (RIFD) tags, comprising:
    producing a plurality of unencoded RFID tags;
    printing desired indicia on the plurality of unencoded RFID tags, the indicia corresponding to desired product or manufacturer information;
    coupling each of the plurality of unencoded RFID tags to each of a plurality of products such that the unencoded RFID tags are placed into the products;
    packaging identical products from the plurality products coupled with the unencoded RFID tags together in a container;
    advancing the container along a length of a conveyor;
    scanning the container holding the plurality of products with at least one RFID antenna;
    adjusting a speed of the conveyor based on a type of the unencoded RFID tags or a number of products in the container for encoding;
    encoding each of the unencoded RFID tags coupled to each of the plurality of products with comparable characteristics in the container simultaneously with identical information to create a plurality of encoded RFID tags; and
    testing the plurality of encoded RFID tags within the container via bulk scanning so as to determine that all the encoded RFID tags within the container are encoded with data having identical information relating to the products and sorting the products such that only identical products are packaged in the container and nonconforming encoded RFID tags are removed for re-encoding or reworking.

2. The method of claim 1, further comprising:
    printing the plurality of unencoded RFID tags at a first location; and
    transferring the plurality of unencoded RFID tags to a second location.

3. The method of claim 2, wherein:
    the first location is an RFID tag manufacturing location; and
    the second location is a product manufacturer, a distributor, a reseller, or a retail location.

4. The method of claim 1, wherein the products are apparel products.

5. The method of claim 1, wherein the unencoded RFID tags are RFID labels.

6. The method of claim 1, wherein the unencoded RFID tags are hard RFID tags.

7. The method of claim 1, further comprising:
    communicating information about the products within a container to the at least one RFID antenna such
    that the information encoded by the at least one RFID antenna corresponds to the products within a particular container.

8. A system for encoding RFID tags in a container with uniform information, comprising:
    a plurality of unencoded RFID tags,
    a plurality of products;
    a plurality of containers;
    and at least one RFID antenna;
    wherein each of the plurality of unencoded RFID tags are coupled to each of the plurality of products such that each of the plurality of products are similar in each of the plurality of containers, advance each of the plurality of containers along a length of a conveyor, adjust a speed of the conveyor based on a type of the plurality of unencoded RFID tags or a number of products in each container for encoding, and each of the plurality of unencoded RFID tags in each container is simultaneously encoded with identical data relating to the plurality of products placed in each of the plurality of containers by the at least one RFID antenna to create a plurality of encoded RFID tags,
    a second RFID antenna arranged opposite to the at least one RFID antenna such that one of the plurality of containers can be disposed between the at least one RFID antenna and the second RFID antenna;
    a quality control unit for testing the plurality of encoded RFID tags within each container of the plurality of containers for a uniform response such that the quality control unit is an interrogator antenna that tests each of the plurality of encoded tags for a uniform response; and
    nonconforming encoded RFID tags are removed for re-encoding or reworking.

9. The system of claim 8, further comprising:
    a sorting mechanism for packaging sorting products such that each of the plurality of containers contains identical products.

10. The system of claim 8, further comprising:
    a conveyor for transporting the plurality of containers past the at least one RFID antenna.

11. The system of claim 10, wherein the conveyor is adapted to transport the plurality of containers at a speed of between 0 feet per minute and 600 feet per minute.

12. The system of claim 8, wherein the at least one RFID antenna is disposed at a distance of 1 foot to 5 feet from one of the plurality of containers.

13. The system of claim 8, wherein each of the plurality of containers contains between 10 and 20 products.

14. The system of claim 8, wherein the products are apparel or garments.

15. A method of bulk encoding RFID tags, comprising:
producing a plurality of unencoded RFID tags;
attaching each of the plurality of unencoded RFID tags to each of a plurality of products;
advancing products from the plurality products with the attached unencoded RFID tags along a length of a conveyor;
scanning each of the unencoded RFID tags attached to each of the plurality of products with at least one RFID antenna; and
adjusting a speed of the conveyor based on a type of the plurality of unencoded RFID tags or a number of products in a container for encoding,
encoding each of the unencoded RFID tags attached to each of the plurality of products with comparable characteristics with identical information sequentially one after another while on the length of the conveyor to create a plurality of encoded RFID tags;
printing desired indicia on the plurality of encoded RFID tags, the indicia corresponding to desired product or manufacturer information;
scanning the plurality of encoded RFID tags with a quality control unit and reserving nonconforming encoded RFID tags for re-encoding, reworking or removal; and
sorting the plurality of products such that only identical products are packaged in each container.

16. A system for encoding RFID tags with uniform information, comprising:
a plurality of unencoded RFID tags,
a plurality of products; and
at least one RFID antenna;
wherein each of the plurality of unencoded RFID tags are coupled to each of the plurality of products,
a sorting mechanism for products and containers to facilitate placing the plurality of products in corresponding containers,
advancing products from the plurality products with the attached unencoded RFID tags along a length of a conveyor;
adjusting a speed of the conveyor based on a type of the plurality of unencoded RFID tags or a number of products in the corresponding container for encoding,
each of the plurality of unencoded RFID tags is encoded one after another with identical data relating to the plurality of products by the at least one RFID antenna creating encoded RFID tags, and
testing the encoded RFID tags within each container via bulk scanning so as to determine that all the encoded RFID tags within each container are encoded with identical data relating to the products within the corresponding container;
identifying nonconforming encoded RFID tags; and
reserving the nonconforming encoded RFID tags for re-encoding, reworking, or removal.

\* \* \* \* \*